Sept. 27, 1949. A. L. J. QUENEAU 2,482,933
GLASS IMPREGNATED CARBON ARTICLES
Filed July 16, 1947

INVENTOR
AUGUSTIN L. J. QUENEAU
BY
ATTORNEYS

Patented Sept. 27, 1949

2,482,933

UNITED STATES PATENT OFFICE 2,482,933

GLASS IMPREGNATED CARBON ARTICLES

Augustin L. J. Queneau, Morristown, N. J.

Application July 16, 1947, Serial No. 761,290

8 Claims. (Cl. 117—121)

This invention relates to articles or products of carbon or graphite adapted for a variety of uses, particularly where strength and resistance to heat, oxidation or the effects of corrosive liquids are desirable.

Carbon, and especially artificial graphite, may be machined readily into articles of various shapes and sizes. The material is, however, inherently weak. It has been the practice heretofore to impregnate the carbon or graphite with suitable fusible plastics such as furfural resins, phenolics and similar materials in order to increase the strength of the material. Products made from such compositions cannot be used at temperatures much over 175° C. owing to the softening or decomposition of the plastic constituent.

It is the object of the present invention to afford machined articles or products including machine parts, electrodes and the like of carbon or graphite which are highly resistant to heat and to corrosive materials and have high tensile and compressive strengths to withstand the strains to which such articles or products may be subjected in use.

Figure 1:
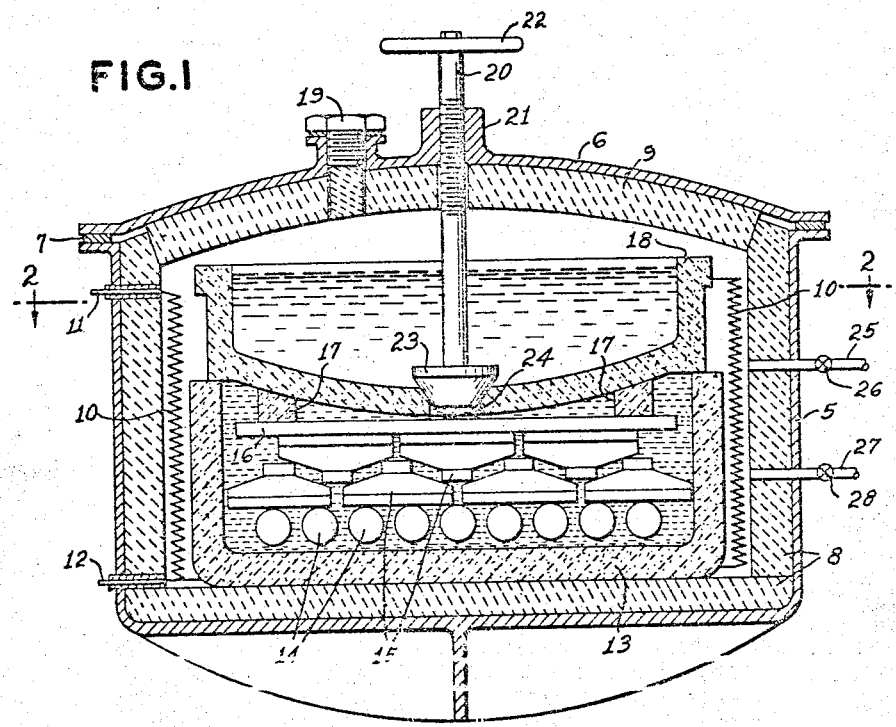
Figure 2:
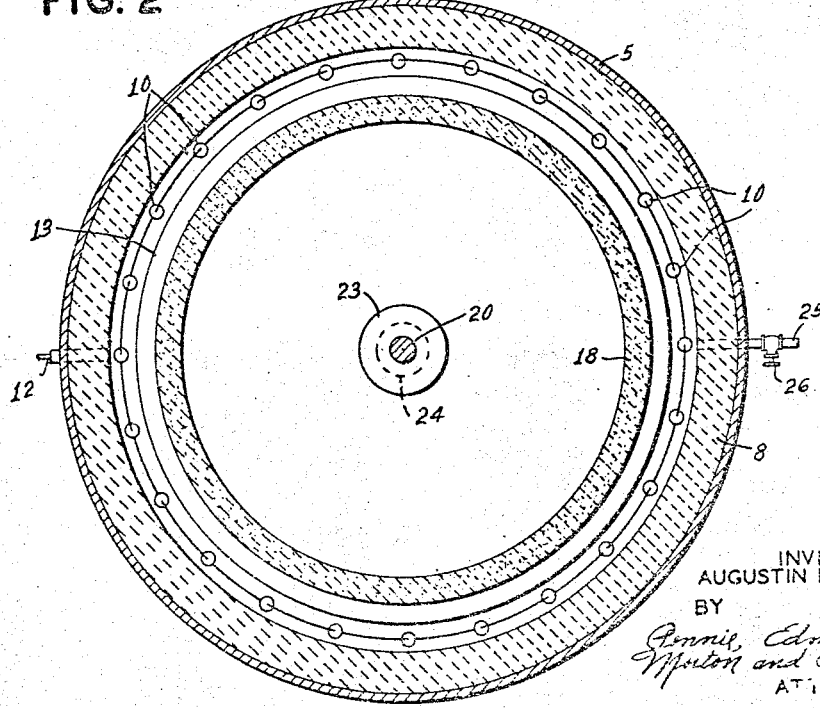

Other objects and advantages of the invention will be apparent as it is better understood by reference to the following specification and the accompanying drawing, in which Fig. 1 is a vertical section through an apparatus suitable for producing articles or products of the invention; and Fig. 2 is a sectional view on the line 2—2 of Fig. 1.

The desired object is accomplished by impregnating or filling the pores of the articles or products of carbon or graphite which may, for example, be preformed by machining or otherwise, with a suitable glass. There are a variety of glasses having relatively low melting points, i. e. 700–800° C., and low viscosities which will readily penetrate the voids in carbon or graphite, particularly under the influence of pressure. Upon cooling, the articles or products will have a non-porous layer of greater or lesser depth, depending upon the treatment, which will afford additional strength and at the same time increase resistance to heat and to corrosion.

Any suitable glass may be employed. For ordinary purposes, I prefer the ternary eutectic $$Na_2O + Na_2O,3CaO,6SiO_2 + SiO_2$$

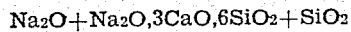

which is liquid at 750° C. The fluidity of the glass may be increased by adding small amounts of barium oxide and iron oxides, or by any other treatment well known to those skilled in the art of manufacturing glass.

The impregnation of the carbon or artificial graphite with glass may extend throughout the body of the article treated or it may be only a marginal layer, depending upon the time of treatment and the amount of pressure applied. In either case, the surface pores will be impregnated with glass extending into them from the surface and deposited and hardened in the pores in situ, with resulting improvement in the character of the article or product.

Such articles and products are especially useful in machine parts, for example in pumps for strong acids and other corrosive fluids including molten metal such as zinc. They may be used also in the form of electrodes, furnace linings and for other purposes wherever strength and resistance to corrosion are essential. The invention is not limited to articles or products of any particular configuration or for any specific uses, since, as is obvious, carbon or artificial graphite can be machined into a great variety of forms and when impregnated with glass, as hereinafter described, the articles or products may be utilized for any purpose to which they may be adapted.

In producing the articles or products of the invention, any suitable apparatus may be used. One form of such an apparatus is illustrated in the accompanying drawings, in which 5 indicates a shell of steel or other suitable material having a cover 6 of like material adapted to be secured thereto in gas-tight relation by means of a gasket 7. A refractory lining 8 of any suitable material is disposed within the shell 5 and a similar refractory lining 9 is provided in the cover 6. The apparatus is adapted to be heated in any suitable manner, preferably by the provision of resistors 10 consisting of metal coils, carbon, graphite, silicon carbide, etc., suitably disposed and connected by conductors 11 and 12 to any suitable source of electric current. Thus, the temperature of the apparatus may be raised to and maintained at the desired point.

Within the container consisting of the shell 5 and the cover 6, a receptacle 13 of any suitable refractory material such as mullite, graphite, etc., is arranged to receive the articles or products to be treated. For the purpose of illustration only, I have shown a plurality of electrodes 14 and pump impellers 15 arranged in layers. It will be understood that any article or product to be treated in accordance with the invention may be similarly disposed for treatment. Bars 16 of suitable refractory material are disposed above the articles, and blocks 17 are disposed thereon. A receptacle 18 of refractory material such as mullite, graphite, etc. is supported on the receptacle 13 and adapted to receive molten glass. The latter may be introduced through an opening in the cover 6 which is normally closed by a threaded plug 19. A valve stem 20 is threadedly supported in the sleeve 21 on the cover 6 and provided with a hand wheel 22. At its lower end the valve stem carries a valve 23 which is adapted to close the opening 24 in the bottom of the receptacle 18.

A pipe 25 extends through the wall of the container 5 and is adapted to be connected to a suitable vacuum pump (not shown) adapted to exhaust the atmosphere of the container 5. The pipe 25 may be closed by a valve 26. A similar pipe 27, controlled by a valve 28, is adapted to be connected to a source of fluid under pressure (not shown), for example, an inert gas such as nitrogen.

The procedure for the impregnation of articles or products will be readily understood in view of the foregoing description of the apparatus. The articles or products are disposed in the receptacle 13 and are held in place by the bars 16. The cover 6 is then applied and current is supplied to the resistors 10 until the temperature is at the desired point, which should be such as to maintain fluidity of the molten glass. A supply of molten glass is then introduced by removing the plug 19. After replacement of the plug, the vacuum pump is employed to evacuate the atmosphere to the desired point. A relatively high vacuum is desirable but not critical. It is desirable to remove as much as possible of the atmosphere within the receptacle so that air in the pores of the articles to be treated is effectively eliminated. When the vacuum is established, the hand wheel 22 is operated to withdraw the valve 23, permitting the molten glass to flow into the receptacle 13 and surround the articles or products disposed therein. The articles 14 and 15 have a tendency to float in the molten glass but are held submerged by the bars 16 and blocks 17, the latter engaging the bottom of the receptacle 18.

Thereupon, fluid under pressure, such as nitrogen, is introduced through the pipe 27 until the desired pressure is attained. The molten glass surrounding the articles or products to be treated is forced into the pores of the carbon or graphite. Depending upon the time allowed, the glass will impregnate the carbon or graphite articles to the extent of a marginal layer or throughout the entire thickness thereof. Usually it is sufficient to afford impregnation only in a marginal layer. The pressure applied by the fluid such as nitrogen may be 200 pounds per square inch or over. It is usually sufficient to maintain the pressure for about 30 minutes, but the time of treatment will vary and is not critical, except that the glass must remain in a fluid condition. When the operation is completed, the fluid pressure is relieved and the cover 6 is removed. Thereafter the articles or products may be withdrawn, the surplus glass may be separated therefrom and the articles or products allowed to cool at the desired rate, preferably in a non-oxidizing atmosphere. The surfaces of the articles or products may be cleaned and dressed and are then ready for use.

In manufacturing articles or products in accordance with the foregoing, I prefer to employ carbon or artificial graphite of a selected porosity which may lie in the range of 10–50 microns and in special cases of over 50 microns. The glass filling the pores of the carbon or graphite to a greater or lesser depth, depending upon the temperature and pressure at which impregnation is effected, will increase the tensile strength of the carbon or artificial graphite to 3000 pounds per square inch or over. Mechanical parts, electrodes and the like of carbon or artificial graphite treated in accordance with the invention will have at least a marginal layer impregnated with glass which resists oxidation and the effect of corrosive liquids.

Various changes may be made in the procedure as described, as well as in the apparatus employed, without departing from the invention or sacrificing the advantages thereof.

I claim:

1. An article of manufacture comprising a body machined to its final form and consisting of porous carbon having a continuous carbon structure, substantially all of the pores of said body being of a size exceeding ten microns, and the pores immediately adjacent a surface thereof and inwardly therefrom for a substantial depth being filled with glass of relatively low melting point extending into them from said surface, said glass having been deposited and hardened in situ.

2. An article of manufacture as set forth in claim 1 in which the glass filling the pores has a melting point between about 700° C. and 800° C.

3. An article of manufacture as set forth in claim 1 in which the carbon is graphite.

4. An article of manufacture as set forth in claim 1 in which said surface of the body has an external, non-porous layer of glass deposited and hardened in situ with the glass filling the pores of the body.

5. An article of manufacture comprising a body machined to its final form and consisting of porous carbon having a continuous carbon structure, substantially all of the pores of said body being of a size exceeding ten microns, and the pores substantially throughout the body being filled with glass of relatively low melting point extending into them from the surface thereof, said glass having been deposited and hardened in situ.

6. An article of manufacture as set forth in claim 5 in which the glass has a melting point of between about 700° C. and 800° C.

7. An article of manufacture as set forth in claim 5 in which the carbon is graphite.

8. An article of manufacture as set forth in claim 5 in which the surfaces of the body have an external, non-porous layer of glass deposited and hardened in situ with the glass filling the pores of the body.

AUGUSTIN L. J. QUENEAU.

REFERENCES CITED

The following references are of record in the file of this patent:

UNITED STATES PATENTS

| Number | Name | Date |
|---|---|---|
| 1,764,311 | Hunt | June 17, 1930 |
| 1,868,206 | Hunter et al. | July 19, 1932 |
| 2,013,625 | Buck | Sept. 3, 1935 |
| 2,280,962 | McDougal | Apr. 28, 1942 |
| 2,336,565 | Parmenter | Dec. 14, 1943 |
| 2,394,041 | Conradty | Feb. 5, 1946 |